United States Patent
Freeman et al.

[11] Patent Number: 6,143,065
[45] Date of Patent: Nov. 7, 2000

[54] PRECIPITATED CALCIUM CARBONATE PRODUCT HAVING IMPROVED BRIGHTNESS AND METHOD OF PREPARING THE SAME

[75] Inventors: Gary Michael Freeman, Macon, Ga.; John Mecaslin MacGeoghegan Harrison, Twiggs, Colo.; Klaus A. Lunden, Kokkedal, Denmark

[73] Assignee: J. M. Huber Corporation, Edison, N.J.

[21] Appl. No.: 09/351,473

[22] Filed: Jul. 12, 1999

[51] Int. Cl.$^7$ .................................................... C09C 1/22
[52] U.S. Cl. .......................... 106/464; 423/430; 423/432
[58] Field of Search .......................... 106/464; 423/430, 423/432

[56] References Cited

U.S. PATENT DOCUMENTS

| | | | |
|---|---|---|---|
| 3,920,800 | 11/1975 | Harris | 423/432 |
| 3,961,971 | 6/1976 | Abercrombie, Jr. et al. | 106/72 |
| 3,980,240 | 9/1976 | Nott | 241/20 |
| 3,984,309 | 10/1976 | Allen et al. | 209/214 |
| 4,165,840 | 8/1979 | Lewis et al. | 241/20 |
| 5,084,254 | 1/1992 | Golley | 423/430 |
| 5,292,365 | 3/1994 | Delfosse | 106/464 |
| 5,846,500 | 12/1998 | Bunger et al. | 423/155 |
| 5,879,442 | 3/1999 | Nishiguchi et al. | 106/464 |
| 5,939,036 | 8/1999 | Porter et al. | 423/432 |

*Primary Examiner*—Mark L. Bell
*Assistant Examiner*—Veronica F. Faison
*Attorney, Agent, or Firm*—Carlos Nieves

[57] ABSTRACT

A method of significantly improving the brightness and shade properties of a high quality PCC product. The method includes providing a calcium containing feed source that contains discoloring impurities. The calcium containing feed source is formed into an aqueous slurry of calcium carbonate. Thereafter, the slurry is fine screened through a 325 mesh screen in order to yield a slurry of filler grade calcium carbonate. The filler grade calcium carbonate slurry is wet milled in order to liberate the discoloring impurities and reduce the median particle size of the calcium carbonate to less than 2 microns. The discoloring impurities are then magnetically separated from the milled calcium carbonate slurry by subjecting the slurry to a high intensity magnetic filed. After the magnetic separation step, the purified slurry may be de-watered to yield a dry powder; or alternatively, the slurry may be retained in aqueous form. In any event, the resultant calcium carbonate product has a median particle size of less than 2 microns and a TAPPI brightness of greater than 96.

23 Claims, 2 Drawing Sheets

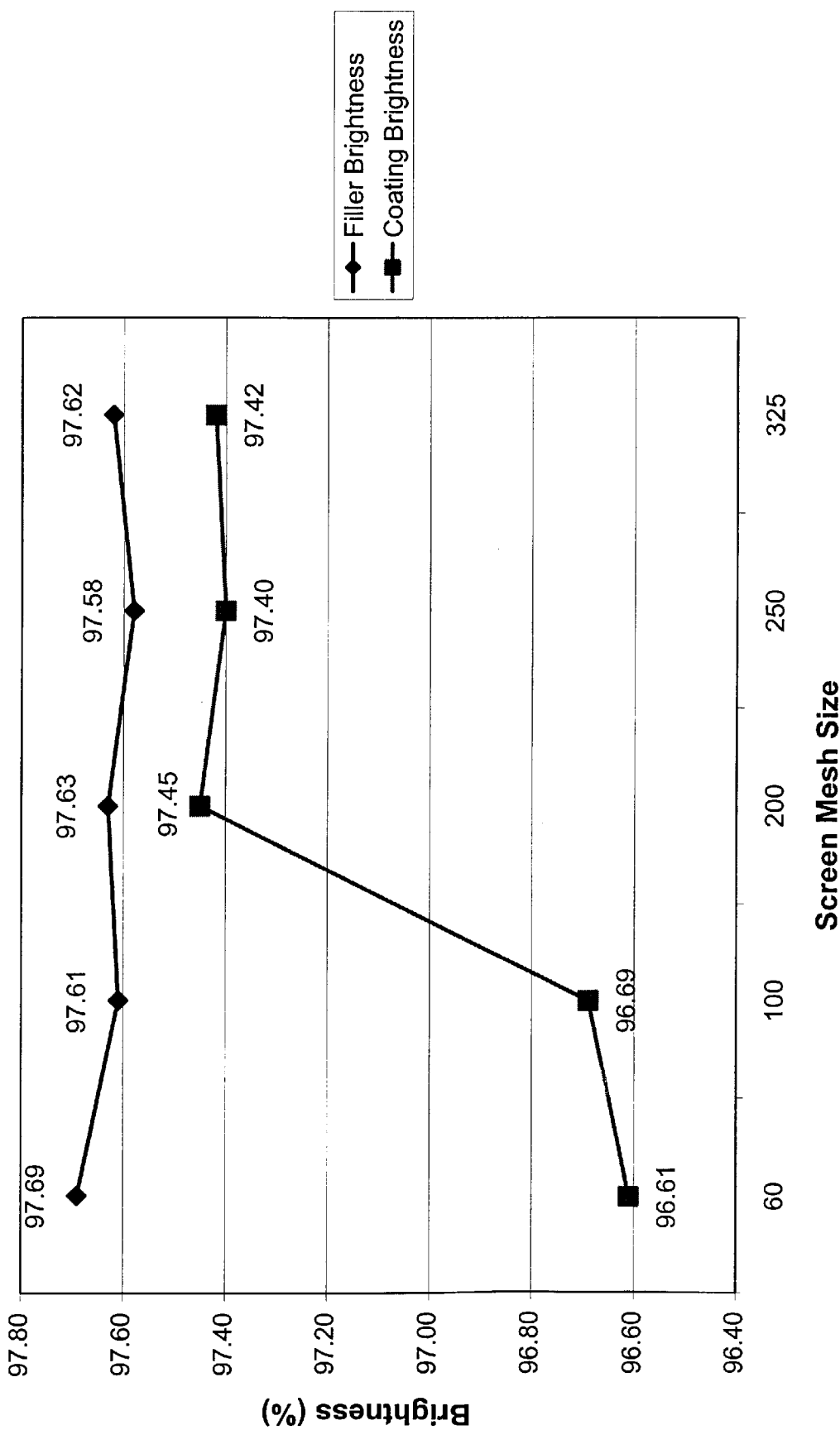

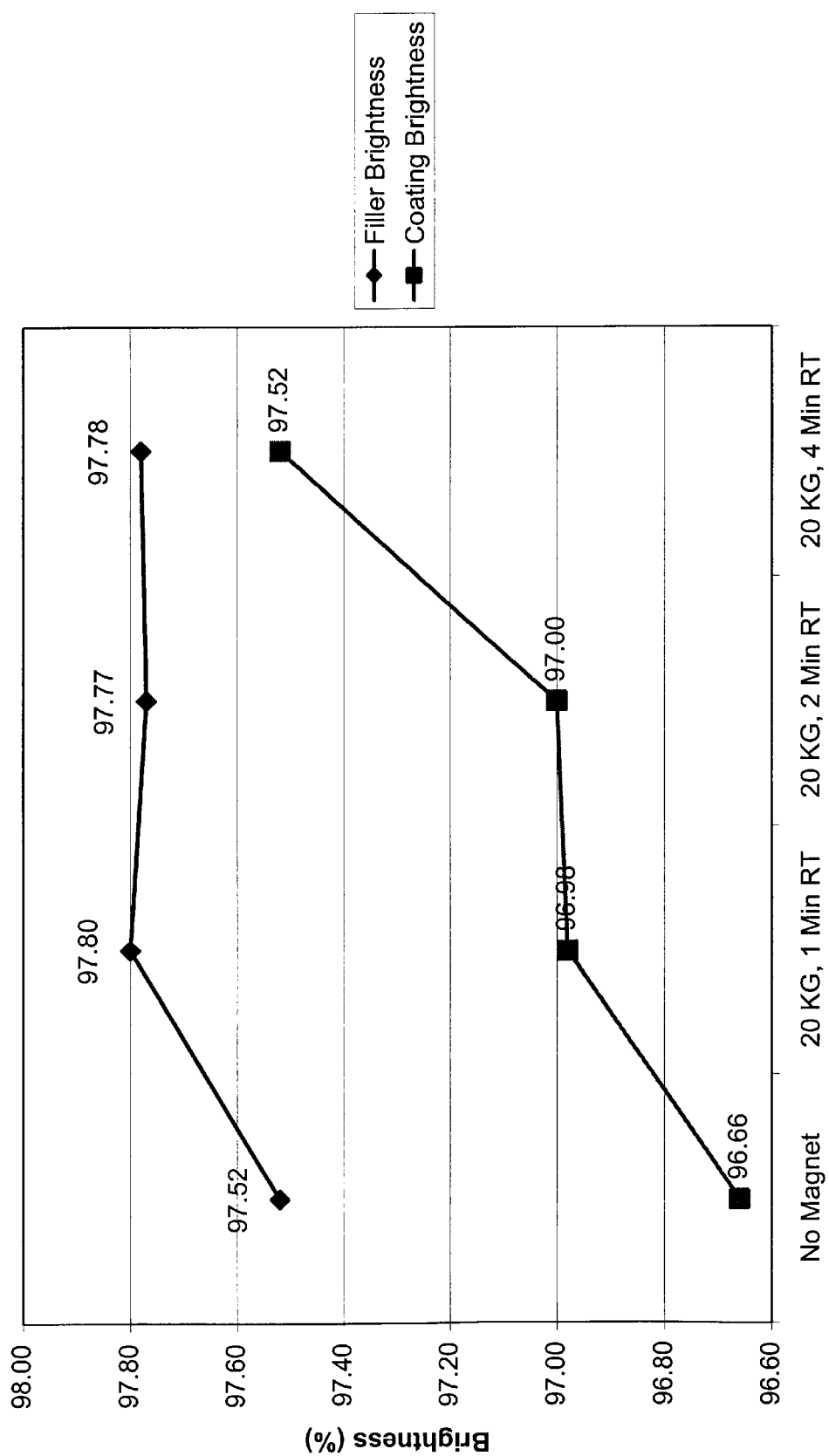

PRECIPITATED CALCIUM CARBONATE PRODUCT HAVING IMPROVED BRIGHTNESS AND METHOD OF PREPARING THE SAME

TECHNICAL FIELD

This invention relates to a calcium carbonate product having improved brightness and, more particularly, to a coating grade, precipitated calcium carbonate product that has a median particle size of less than 2 microns ($\mu$m) and a TAPPI Brightness of greater than 96. The invention also relates to a process of brightening a precipitated calcium carbonate product by removing dark colored impurities through the steps fine screening and magnetic separation.

BACKGROUND OF THE INVENTION

Calcium carbonate, $CaCO_3$, occurs naturally in the form of limestone, marble, chalk and coral. Powdered calcium carbonate is produced by either chemical methods or by the mechanical treatment of the natural materials. The term precipitated calcium carbonate applies to the commercial types of the compound produced chemically in a precipitation process. The precipitated products are generally finer in particle size, have a more uniform particle size distribution and a higher degree of chemical purity. A wide variety of calcium carbonate particle sizes and particle shapes can be chemically produced via the precipitation processes. Calcium carbonate is commonly precipitated in the form of calcite, in which the crystals are typically either rhombohedral, cubic or scalenohedral in shape, or in the form of aragonite, which is aciculir. Vaterite is another precipitated form of calcium carbonate known in the art that is metastable. Precipitated calcium carbonate is an extremely versatile filler and pigment that is utilized in a wide variety of manufactured products including paper, paint, plastics, rubber, textiles and printing inks.

Precipitated calcium carbonate (PCC) is used on a large scale in paper filling and coating applications. PCC is utilized to increase the opacity and brightness of paper. In addition to the desirable opacifying and brightening characteristics, PCC provides a high resistance to yellowing and aging of paper. In many high grade coating applications, a fine particle size calcium carbonate is required (median particle size <2 microns). It is typically desirable for the calcium carbonate to be as bright as possible in these high grade coating applications. However, it is difficult to remove the fine dark colored impurities that are introduced by the initial burnt lime source, which is commonly utilized as the raw material in the PCC precipitation process. Such impurities have a negative impact on the brightness and shade properties of the resultant PCC reaction products after processing. More particularly, wet media milling is a common step in the processing of coating grade PCC. It has been found that wet media milling precipitated calcium carbonate generally results in significant loses in pigment brightness due to the grinding of the dark colored impurities present therein. Chemically, a burnt lime is principally CaO, but examples of the impurities commonly found in the burnt lime source include pyrite (iron sulfide), magnesium iron oxides, calcium iron oxides, calcium sulfide and crystalline silicas. As the particle size of the dark particle impurities is reduced through grinding their tinctorial color strength increases dramatically thereby resulting in significant loses in overall product brightness. The loss of PCC pigment brightness from grinding can be on the order of 1.5 to 2.5 points depending on the initial burnt lime source and degree of grinding.

Heretofore, in order to obtain a high quality PCC product with an acceptable brightness, the CaO starting material that is utilized must be of a high quality, i.e. low levels of impurities. If a high quality burnt lime source is not readily accessible, significant logistics costs, about 10%, are added to the cost of the PCC product. Accordingly, the resultant PCC product is relatively expensive.

SUMMARY OF THE INVENTION

The present invention is designed to overcome the deficiencies discussed above. It is an object of the invention to provide a high grade, precipitated calcium carbonate product that has a median particle size of less than 2 microns and a TAPPI brightness of greater than 96.

It is a further object of the present invention to provide a process for making a high grade, precipitated calcium carbonate product through the use of magnetic separation and fine screening.

It is yet another object of the invention to provide such a process that allows a lower quality CaO feed material (e.g., burnt lime) to be used so that the resultant PCC product can be made from lower cost and/or more readily available sources.

In accordance with the present invention, there is provided a method of significantly improving the brightness and shade properties of a high quality PCC product. The method includes providing a calcium containing feed source that contains discoloring impurities. The feed source is either a hydrated lime slurry (produced from the slaking of CaO) or an aqueous slurry of calcium carbonate product. In one mode of the invention, the hydrated lime slurry is subjected to magnetic separation using a high gradient magnetic field in order to remove the discoloring impurities. After this purification, the hydrated lime slurry is then carbonated in a reactor to yield a resultant PCC product of high brightness. Hydrated lime slurries are also commonly referred to in the literature as milk of lime (MOL). More commonly, however, the preferred calcium containing feed source is a PCC reactor product delivered in a slurry form from a carbonation reactor. Thereafter, the PCC slurry is fine screened through a 325 mesh screen (45 $\mu$m) in order to yield a filler grade calcium carbonate slurry. The filler grade calcium carbonate slurry is wet milled in order to reduce the median particle size of the calcium carbonate to less than 2 microns and thereby liberates the discoloring impurities that were entrained therein. The discoloring impurities are then magnetically separated from the deagglomerated calcium carbonate slurry by subjecting the slurry to a high intensity magnetic field. After the magnetic separation step, the purified slurry may be de-watered to yield a dry powder; or alternatively, the PCC slurry may be retained in aqueous form and concentrated as desired. In any event, the resultant calcium carbonate product preferably has a median particle size of less than 2 microns and a TAPPI brightness of greater than 96.

BRIEF DESCRIPTION OF THE DRAWINGS

FIG. 1 is a graphical representation showing the effect of screening milk of lime (MOL) on the brightness of the resultant filler grade and coating grade PCC products produced therefrom, and FIG. 2 is a graphical representation showing the impact of increasing the magnet residence time of the MOL on brightness of the resultant filler grade and coating grade PCC produced therefrom.

DETAILED DESCRIPTION OF PREFERRED EMBODIMENTS

In accordance with the preceding summary, the present invention is directed toward a method of obtaining high grade, precipitated calcium carbonate products having a median particle size of less than 2 microns and a TAPPI brightness of greater than 96, and more preferably, a particle size of less than 1 micron and a TAPPI brightness of greater than 97. The precipitated calcium carbonate products of the present invention are obtained through a combination of magnetic separation and fine screening. More specifically, the present inventive process includes providing a calcium containing feed source for magnetic separation that contains discoloring impurities. The calcium feed source used for making PCC products is typically burnt lime (CaO). Burnt lime is also commonly referred to as quick lime or calcined limestone. The discoloring particulates in the burnt lime appear to principally consist of calcium iron oxide that is likely produced during the high temperature calcination of natural limestone as a result of the presence of pyritic impurities. Other feed sources for calcination into burnt lime include: chalk, coral and marble. The CaO feed source can be purified by magnetic separation once it has been slaked into a milk of lime slurry. The purified milk of lime slurry is then subsequently used to produce a high quality PCC product of high brightness. Additionally, the initial calcium containing feed source for magnetic separation can be a precipitated calcium carbonate as more fully described below.

When the initial calcium containing feed source for magnetic separation is a precipitated calcium carbonate, the entire inventive process includes the step of adding burnt lime to a slaker where the CaO is hydrated to yield milk of lime (also known as calcium hydroxide or $Ca(OH)_2$). The milk of lime slurry is preferably hydrated to about 20% solids by weight, however hydration can take place to varying ranges of percent solids. The milk of lime is then coarse screened through about a 140 to about 50 mesh screen, and more preferably through a 100 mesh screen. In the preferred method, the $Ca(OH)_2$ is then fine screened through about a 200 mesh to about 500 mesh screen and, even more preferably, through a 325 mesh screen to remove sand and other dark particulate matter. It should be noted that the step of fine screening can take place at other stages of the inventive process as more fully described below. The % solids of the fine screened slurry of $Ca(OH)_2$ is then preferably reduced to about 12 to 15% by weight. Thereafter, the calcium hydroxide slurry is introduced into a PCC reactor where it is carbonated to yield a slurry of precipitated calcium carbonate. The product that comes out of the PCC reactor is referred to herein as a filler grade precipitated calcium carbonate slurry. It should be noted that the filler grade PCC slurry can be fine screened after it comes out of the PCC reactor. This filler grade precipitated calcium carbonate slurry, after dispersion with an anionic dispersant to reduce its viscosity, can serve as a calcium feed source for magnetic separation.

The filler grade precipitated calcium carbonate slurry delivered by the PCC reactor is typically from about 15 to about 20% solids. In a preferred method, this PCC slurry is decanted to a filler grade PCC containing about 50% solids by weight. The decanting is preferably accomplished by means of mechanical de-watering with a centrifuge. Alternatively, the PCC product can be filtered by means of a filter press or similar filtering devices. Thereafter, the filler grade PCC is placed into a high speed mixer of a type known in the art and dispersed into a low viscosity slurry, preferably with an anionic dispersant such as a sodium polyacrylate (NaPA). The dispersant is added at this point to improve distribution of the solids within the liquids and allow efficient, subsequent wet grinding. The dispersant is added in an amount sufficient to reduce and keep the Brookfield viscosity of the slurry to less than about 100 cps (at 20 rpm). It is noted that upon wet grinding, the slurry viscosity will increase.

After the dispersant is added to the slurry and good distribution is obtained, the mixture, which is preferably at about 50% solids by weight, is then transferred to a wet grinding media mill. One preferred wet grinding mill is a Drais Mill manufactured by Draiswerke, Inc., Mahway, N.J. The Drais mill is a horizontal style media mill. To produce a PCC coating product, the dispersed, filler grade PCC slurry is then wet milled in order to deagglomerate the PCC into smaller aggregates or its individual crystals. Alternatively, deagglomeration can be achieved by use of a high shear, rotor-stator type mixer. The rhombohedral particle form is the preferred particle form for PCC which is used in high grade coating applications. It should be noted that the inventive process set forth herein can also be applied to obtain other fine particle size, coating grade PCC products of various morphologies and crystal structures.

It has been found that when the particle size of the milled PCC is reduced to below 2 microns, as measured by a Sedigraph particle size analyzer (Model 5100, manufactured by Micromeritics Instrument Corp., Norcross, Ga.), the brightness drops to undesirable levels. The brightness drop appears to occur as a result of the grinding of iron containing impurities which takes place at the media milling stage. Brightness drops on the order of 1.5 to 2.5 points (depending on the initial burnt lime source) when the particle size is reduced to below 0.6 microns. To prevent the drop off in brightness, the present inventors have discovered that by subjecting the media milled PCC slurry to a high intensity magnetic field, the "magnetic" dark particulates can be separated out and a high purity, coating grade PCC slurry can be obtained. Factors affecting magnetic separation include the intensity of the magnetic field, the fineness of the steel wool matrix employed in the magnet's canister, the % solids of the PCC slurry, the viscosity of the slurry and the residence time in the magnetic separator.

Accordingly, the present inventive method includes the step of passing the wet milled, PCC slurry through a wet, high intensity magnetic separator. One known type of magnetic separator is a continuous flow magnetic particle separator of the type described in U.S. Pat. No. 3,983,309 to Allen et al., the contents of which are incorporated herein by reference. A preferred magnetic separator is the High Gradient Magnetic Separator (HGMS) available from Erie, Magnetics, Inc., Erie, Pa.; Pacific Electric Motors, Inc. (PEM), Oakland, Calif.; Carpco, Jacksonville, Fla.; and others). This high intensity magnetic separator is effective in separating fine, submicron sized impurities of a paramagnetic nature as well as the more strongly magnetic ferromagnetic particles.

As previously noted, the step of magnetic separation can take place at other stages of the inventive process. For example, the discoloring impurities can be magnetically removed from the calcium hydroxide slurry prior to its carbonation into precipitated calcium carbonate. Further, the magnetic separation can take place prior to or immediately following the stage where the PCC filler grade slurry is fine screened. However, it has been found that the final brightness benefits obtained are the highest when the dispersed, milled PCC slurry is subjected to magnetic separation.

After the magnetic separation step, the purified slurry may be de-watered to yield a dry powder; or alternatively, the slurry may be retained in aqueous form and concentrated as desired. The de-watering step typically is effected via an evaporator in a manner known in the art. The purified slurry may also be fine screened at this stage. In any event, the resultant PCC product preferably has a median particle size of about less than 2 microns and a TAPPI brightness of at greater than 96. TAPPI brightness method used herein is T646 om-86 "Brightness of clay and other minerals." Brightness is measured utilizing a Technibrite Model TB-1C brightness meter available from Technidyne Corporation, New Albany, Ind.

In order to demonstrate the efficacy of the present inventive process, a number of illustrative Examples and Tables follow. Examples I and II show the effect of magnetic separation on brightness and shade characteristics of samples of rhombohedral PCC products prepared from Bedford and Marbleton, Quebec, Canada burnt lime referred to herein as Bedford PCC or Marbleton PCC, respectively. The CaO feed sources in Examples I and II were PCC quality burnt limes having a $Fe_2O_3$ content of less than 0.2% and a MnO content of less than 0.007%. The iron and manganese content present in the burnt lime feed is well known to have a direct bearing on the resultant PCC brightness values obtained. The burnt lime utilized in Examples I and II was hydrated in a slaker and then converted into a filler grade PCC product in the manner described above. The magnetic separator utilized in Examples I and II was a 2 Tesla Field Strength, lab-scale magnet unit equipped with a 25–30 micron ultrafine fiber steel wool matrix utilizing a 4 minute retention time with 4 canisters. The field intensity of the magnet was 20 kilogauss. The PCC filler or coating products fed into the magnetic separator were of about 20% solids. To facilitate good magnetic separation, Accumer 9300 sodium polyacrylate dispersant available from Rohm & Haas, Philadelphia, Pa. was added to the "magnet feed" slurry to reduce the viscosity to <50 cps at 20 rpm.

EXAMPLE I

A 20% solids slurry of Bedford PCC (filler grade) was provided. The PCC pigment had a TAPPI brightness of 97.23, a median particle size of 1.23 microns (Sedigraph) and a 75/25 slope value of 1.76.

The particle size "75/25 slope" values herein is a measure of a product's particle size distribution. The lower the 75/25 slope value the more narrow the particle size distribution. Conversely, the higher the 75/25 slope value the broader the particle size distribution. The particle 75/25 slope is measured as the ratio value of a pigment's particle size measured in microns at the 75 percentile divided by the particle size measured in microns at the 25 percentile. All particle size measurements were taken with a Micromeritics Sedigraph 5100 X-ray sedimentation type instrument, which uses Stokes Law in determining particle diameters. Hence, a PCC coating pigment that has 75% of its particles <0.8 microns and 25% of its particles <0.4 microns would therefore have a 75/25 slope value of 0.8/0.4=2.0.

The PCC filler slurry was then processed in one of the following ways:

1) The filler grade PCC slurry was screened to −325 mesh screen and to −500 mesh. The −325 mesh screened product had a TAPPI brightness of 97.25 and the −500 mesh screened product had a TAPPI brightness of 97.38.

2) The filler grade slurry was wet ground in a Drais media mill to a median particle size of 0.53 micron where it exhibited a TAPPI brightness of 95.6 and a slope of 1.66. The resulting PCC coating product was then screened to −325 mesh where it exhibited a TAPPI brightness of 95.6 and to −500 mesh where it exhibited a TAPPI brightness of 95.62.

Alternatively, the wet milled PCC slurry was subjected to a step of magnetic separation and the resulting product had a median particle size of 0.52 microns and exhibited a TAPPI brightness of 97.83 and a slope of 1.67. Thereafter, the magnetically separated product was screened to −325 mesh where it exhibited a TAPPI brightness of 97.83 and to −500 mesh where it exhibited a TAPPI brightness of 97.85.

3) The filler grade PCC slurry was magnetically separated and the resulting product had a median particle size of 1.21 microns (Sedigraph) and exhibited a brightness of 97.65 and a slope of 1.78. The magnetically separated slurry was then screened to −325 mesh where it exhibited a TAPPI brightness of 97.65 and to −500 mesh where it exhibited a TAPPI brightness of 97.67.

Alternatively, the magnetically separated filler product was wet ground in a Drais media mill to a particle size of 0.53 microns where it exhibited a TAPPI brightness of 97.32 and a slope of 1.68. Thereafter, the magnetically separated and milled product was screened to −325 mesh where it exhibited a TAPPI Brightness of 97.30 and to −500 mesh where it exhibited a TAPPI brightness of 97.34.

Standard US screens were employed. As used herein, "minus mesh" (−mesh) means the material went through the screen and "plus mesh" (+mesh) means material stayed on top of the screen. For example a product milled to −325 mesh goes through a 325 mesh screen and is therefor smaller than 325 mesh.

As can be seen in Example I, the best results, 2.2 point improvement, were obtained by first wet grinding the filler grade PCC slurry, then magnetically separating the discoloring impurities and finally fine screening the resultant magnetically separated product. It is also noted that when the filler grade PCC is subjected to magnetic separation prior to wet grinding, brightness values decrease only 0.3 points upon grinding as compared to a 1.6 point decrease upon grinding without prior magnetic separation.

EXAMPLE II

A 20% solids slurry of Marbleton PCC (filler grade) was provided. The PCC pigment had a TAPPI brightness of 97.23, a median particle size of 1.07 microns (Sedigraph) and a 75/25 slope value of 1.85. This slurry was then processed in one of the following ways:

1) The filler grade PCC slurry was screened to −325 mesh and to −500 mesh. The −325 mesh screened product had a TAPPI brightness of 97.24 and the −500 mesh screened product had a TAPPI brightness of 97.28.

2) The filler grade slurry was wet ground in a Drais media mill to a median particle size of 0.53 micron where it exhibited a TAPPI brightness of 95. 91 and a slope of 1.77. The resulting PCC coating product was then screened to −325 mesh where it exhibited a TAPPI brightness of 95.90 and to −500 mesh where it exhibited a TAPPI brightness of 95.92.

Alternatively, the wet milled PCC slurry was subjected to a step of magnetic separation and the resulting product had a median particle size of 0.54 microns and exhibited a TAPPI brightness of 97.95 and a slope of 1.68. Thereafter, the magnetically separated product was screened to −325 mesh where it exhibited a TAPPI brightness of 97.96 and to −500 mesh where it exhibited a TAPPI brightness of 97.97.

3) The filler grade PCC slurry was magnetically separated and the resulting product had a median particle size of 1.11 microns (Sedigraph) and exhibited a brightness of 98.00 and a slope of 1.90. The magnetically separated slurry was then screened to −325 mesh where it exhibited a TAPPI brightness of 98.01 and to −500 mesh where it exhibited a TAPPI brightness of 98.02.

Alternatively, the magnetically separated product was wet ground in a Drais media mill to a particle size of 0.50 microns where it exhibited a TAPPI brightness of 97.68 and a slope of 2.0. Thereafter, the magnetically separated and milled product was screened to −325 mesh where it exhibited a TAPPI Brightness of 97.67 and to −500 mesh where it exhibited a TAPPI brightness of 97.69.

Once again, Example II demonstrated that the best results, a 2.0 point improvement, were obtained by first wet grinding the filler grade PCC slurry, then magnetically separating the discoloring impurities and finally fine screening the resultant magnetically separated product.

EXAMPLE III

Two rhombohedral PCC coating products (derived from Bedford and Marbleton limes, respectively) were produced in order to determine the effect of field strength and residence time on the final brightness of the magnetically separated PCC products. The PCC coating products in Example III were produced at 20% solids by wet-grinding the PCC filler slurries in non-dispersed form to a median particle size of 0.52 microns. Thereafter, the products were each dispensed with Accumer 9300 NAPA and then subjected to magnetic separation under varying magnet conditions to ascertain the net effects on final product brightness. A PEM Magnet, Laboratory Model, 1"D×20" bore was utilized. As can be seen in Tables I and II, retention times as low as 1 minute and magnet field strengths of from 5 to 20 kilogauss were explored.

TABLE I

Magnetic Field Strength Study of Bedford PCC

| Sample ID | % Brightness | Whiteness | Yellowness | L | a | B |
|---|---|---|---|---|---|---|
| Feed | 95.60 | 99.73 | 1.56 | 98.36 | 0.50 | 0.98 |
| 20 KG | | | | | | |
| 4 Min RT | | | | | | |
| 0–4 cans | 97.86 | 94.90 | 0.89 | 99.20 | 0.50 | 0.52 |
| 4–8 cans | 97.77 | 94.55 | 0.97 | 99.17 | 0.46 | 0.57 |
| 8–12 cans | 97.59 | 94.13 | 1.05 | 99.12 | 0.41 | 0.63 |
| 2 Min RT | | | | | | |
| 0–4 cans | 97.71 | 94.55 | 0.95 | 99.14 | 0.48 | 0.56 |
| 1 Min RT | | | | | | |
| 0–4 cans | 97.73 | 94.49 | 0.98 | 99.17 | 0.49 | 0.58 |
| 16 KG | | | | | | |
| 4 Min RT | | | | | | |
| 0–4 cans | 97.78 | 94.68 | 0.94 | 99.18 | 0.47 | 0.55 |
| 12 KG | | | | | | |
| 4 Min RT | | | | | | |
| 0–4 cans | 97.68 | 94.63 | 0.92 | 99.12 | 0.51 | 0.54 |

TABLE I-continued

Magnetic Field Strength Study of Bedford PCC

| Sample ID | % Brightness | Whiteness | Yellowness | L | a | B |
|---|---|---|---|---|---|---|
| Feed | 95.60 | 99.73 | 1.56 | 98.36 | 0.50 | 0.98 |
| 8 KG | | | | | | |
| 4 Min RT | | | | | | |
| 0–4 cans | 97.66 | 94.58 | 0.94 | 99.13 | 0.47 | 0.55 |
| 4 Min RT | | | | | | |
| 0–4 cans | 97.65 | 94.27 | 1.04 | 99.02 | 0.42 | 0.63 |

The number of canisters (referred to in the tables as "cans") refers to the unit volume of material passing through the magnet and is related to cycle time in the magnet. The more "cans", the more efficient the process. As can be seen from Table I, the brightness of a composite sample of canisters 8–12 was 97.59, dropping only 0.27 points from the 0–4 canister composite.

TABLE II

Magnetic Field Strength Study of Marbleton PCC

| Sample ID | % Brightness | Whiteness | Yellowness | L | a | b |
|---|---|---|---|---|---|---|
| Feed | 95.91 | 91.34 | 1.46 | 98.49 | 0.51 | 0.91 |
| 20 KG | | | | | | |
| 4 Min RT | | | | | | |
| 0–4 cans | 97.76 | 94.79 | 0.89 | 99.15 | 0.49 | 0.52 |
| 4–8 cans | 97.73 | 94.55 | 0.97 | 99.17 | 0.43 | 0.57 |
| 8–12 cans | 97.76 | 94.78 | 0.98 | 99.14 | 0.48 | 0.52 |
| 2 Min RT | | | | | | |
| 0–4 cans | 97.87 | 94.92 | 0.88 | 99.18 | 0.44 | 0.51 |
| 1 Min RT | | | | | | |
| 0–4 cans | 97.7 | 94.31 | 1.02 | 99.16 | 0.54 | 0.61 |
| 16 KG | | | | | | |
| 4 Min RT | | | | | | |
| 0–4 cans | 97.85 | 94.9 | 0.89 | 99.2 | 0.44 | 0.52 |
| 12 KG | | | | | | |
| 4 Min RT | | | | | | |
| 0–4 cans | 97.88 | 94.97 | 0.87 | 99.2 | 0.47 | 0.51 |
| 8 KG | | | | | | |
| 4 Min RT | | | | | | |
| 0–4 cans | 97.75 | 94.59 | 0.94 | 99.15 | 0.46 | 0.56 |
| 5 KG | | | | | | |
| 4 Min RT | | | | | | |
| 0–4 cans | 97.56 | 94.27 | 1.00 | 99.09 | 0.53 | 0.6 |

Tables I and II demonstrate that in processing low solids, PCC coating slurries, in dispersed form, effective magnetic separation results as based on TAPPI brightness response can be achieved with a 4 minute retention time while utilizing magnet field strengths as low as 5 KG. Additionally, when utilizing a magnetic separator at a field strength of 20 KG, a retention time as low as one minute was successfully utilized with minimal negative affect on the resultant PCC brightness values. For the Bedford based PCC coating product, TAPPI brightness decreased less than 0.2 points when using retention times of 2 minutes and 1 minute, while the corresponding brightness decrease for Marbleton based PCC coating products was essentially zero.

EXAMPLE IV

A filler grade PCC slurry at 50% and 20% solids (produced from Bedford lime) was provided to which Dispex 2695 dispersant available from Allied Colloids, Suffolk, Va. was added on a 0.8% active weight basis. The Bedford burnt lime used in making the filler grade PCC had the following trace contaminant composition:

$Fe_2O_3$=0.137%
MnO=0.0041%
MgO=1.21%
$SiO_2$=0.697%
S=8290 ppm

A portion of the 50% or 20% solids, dispersed filler grade PCC slurry was converted into a PCC coating control product by wet-grinding it in a horizontal media mill to a target median particle size of 0.57 microns (Sedigraph) and a 75/25 slope value of about 1.85. Portions of the PCC filler product were magnetically separated at either 50% solids or 20% solids using a Model A pilot magnetic separator operating at 16 KG using various retention times and different numbers of canisters. Thereafter the magnetically separated filler grade PCC products were wet-ground to coating grade PCC with a target median particle size of 0.57 microns.

Brightness was measured on each of the paired filler and coating grade PCC products to show the effect of different magnetic separation parameters on coating grade PCC. The Model A pilot magnetic separator was equipped with a 4.5 inch diameter by 18.5 inch long canister packed with a 25 micron steel wool matrix. All magnetic separation runs were made at 16 KG using retention times of 0.5 to 4 minutes. Tables III and IV demonstrate the effects of magnetic separation on filler grade and coating grade PCC slurries at 50% and 20% solids, respectively.

TABLE III

Model "A" Magnet Experiments

| | 50% SOLIDS - Bedford PCC | | | | | | Sedigraph 75/25 | |
|---|---|---|---|---|---|---|---|---|
| ID | Brightness % | White | Yellow | L | a | b | MPS | Slope |
| Filler (as rec) | 97.46 | 93.75 | 1.12 | 99.07 | 0.51 | 0.68 | 0.85 | 1.79 |
| Coating (control) | 95.85 | 90.57 | 1.67 | 98.51 | 0.47 | 1.05 | 0.56 | 1.85 |
| EXPT. #1 | 16 kG's 2 Min. R.T. 4 Canisters 50% Solids | | | | | | | |
| Magnet | 98.27 | 95.03 | 0.96 | 99.41 | 0.44 | 0.57 | | |
| Wet-ground | 98.10 | 94.81 | 0.99 | 99.37 | 0.43 | 0.59 | 0.57 | 1.81 |
| | 16 kG's 2 Min R.T. 8 Canisters 50% Solids | | | | | | | |
| Magnet | 98.22 | 94.91 | 0.98 | 99.38 | 0.46 | 0.58 | | |
| Wet-Ground | 97.90 | 94.47 | 1.03 | 99.26 | 0.49 | 0.62 | 0.59 | 1.77 |
| | 16 kG's 2 Min R.T. 16 canisters 50% Solids | | | | | | | |
| Magnet | 98.23 | 95.01 | 0.96 | 99.39 | 0.44 | 0.57 | | |
| Wet-Ground | 97.86 | 94.36 | 1.07 | 99.28 | 0.45 | 0.64 | 0.59 | 1.81 |
| EXPT. #2 | 16 kG's 4 Min R.T. 4 Canisters 50% Solids | | | | | | | |
| Magnet | 98.57 | 95.68 | 0.84 | 99.51 | 0.48 | 0.49 | | |
| Wet-Ground | 98.39 | 95.53 | 0.85 | 99.44 | 0.46 | 0.49 | 0.59 | 1.77 |
| | 16 kG's 4 Min R.T. 8 Canisters 50% Solids. | | | | | | | |
| Magnet | 98.38 | 95.42 | 0.86 | 99.42 | 0.49 | 0.50 | | |
| Wet-Ground | 98.05 | 94.85 | 0.95 | 99.30 | 0.46 | 0.56 | 0.59 | 1.77 |
| | 16 kG's 4 Min R.T. 16 Canisters 50% Solids | | | | | | | |
| Magnet | 98.19 | 95.07 | 0.92 | 99.35 | 0.46 | 0.54 | | |
| Wet-Ground | 97.96 | 94.61 | 1.01 | 99.29 | 0.40 | 0.67 | 0.59 | 1.79 |
| EXP. #3 | 16 kG's 1 Min R.T. 4 Canisters 50% Solids | | | | | | | |
| Magnet | 98.32 | 94.97 | 0.98 | 99.42 | 0.46 | 0.58 | | |
| Wet-Ground | 98.21 | 95.02 | 0.94 | 99.36 | 0.51 | 0.56 | 0.60 | 1.80 |
| EXPT. #4 | 16 kG's 0.5 Min R.T. 4 Canisters 50% Solids | | | | | | | |
| Magnet | 98.39 | 95.19 | 0.93 | 99.44 | 0.50 | 0.55 | | |
| Wet-Ground | 98.17 | 94.83 | 0.99 | 99.36 | 0.49 | 0.59 | 0.61 | 1.76 |

TABLE IV

Model "A" Magnet Experiments

| | 20% SOLIDS - Bedford PCC | | | | | | Sedigraph 75/25 | |
|---|---|---|---|---|---|---|---|---|
| ID | % Brightness | White | Yellow | L | a | b | MPS | Slope |
| Filler (as rec) | 97.46 | 93.75 | 1.12 | 99.07 | 0.51 | 0.68 | 0.85 | 1.79 |
| Coating (control) | 95.85 | 90.57 | 1.67 | 98.51 | 0.47 | 1.05 | 0.56 | 1.85 |
| EXPT. #5 | 16 kG's 2 Min. R.T. 4 Canisters 20% Solids | | | | | | | |
| Magnet | 98.64 | 95.74 | 0.84 | 99.54 | 0.42 | 0.49 | | |
| Wet-Ground | 98.53 | 95.65 | 0.81 | 99.42 | 0.42 | 0.47 | 0.56 | 1.88 |
| | 16 kG's 2 Min R.T. 8 Canisters 20% Solids | | | | | | | |
| Magnet | 98.71 | 95.82 | 0.82 | 99.55 | 0.41 | 0.47 | | |
| Wet-Ground | 98.52 | 95.72 | 0.79 | 99.42 | 0.41 | 0.45 | 0.58 | 1.85 |
| | 16 kG's 2 Min R.T. 16 Canisters 20% Solids | | | | | | | |
| Magnet | 98.58 | 95.43 | 0.91 | 99.51 | 0.39 | 0.53 | | |
| Wet-Ground | 98.53 | 95.72 | 0.80 | 99.44 | 0.36 | 0.46 | 0.58 | 1.88 |
| EXPT. #6 | 16 kG's 4 Min R.T. 4 Canisters 20% Solids | | | | | | | |
| Magnet | 98.67 | 95.73 | 0.84 | 99.53 | 0.39 | 0.49 | | |
| Wet-Ground | 98.49 | 95.55 | 0.84 | 99.44 | 0.39 | 0.49 | 0.58 | 1.83 |
| | 16 kG's 4 Min R.T. 8 Canisters 20% Solids | | | | | | | |
| Magnet | 98.57 | 95.52 | 0.88 | 99.50 | 0.41 | 0.52 | | |
| Wet-Ground | 98.46 | 95.49 | 0.85 | 99.43 | 0.40 | 0.50 | 0.58 | 1.9 |
| | 16 kG's 4 Min R.T. 16 Canisters 20% Solids | | | | | | | |
| Magnet | 98.62 | 95.96 | 0.78 | 99.52 | 0.41 | 0.45 | | |
| Wet-Ground | 98.45 | 95.70 | 0.81 | 99.45 | 0.40 | 0.47 | 0.58 | 1.88 |
| EXPT. #7 | 16 kG's 1 Min R.T. 4 Canisters 20% Solids | | | | | | | |
| Magnet | 98.63 | 95.80 | 0.82 | 99.54 | 0.40 | 0.48 | | |
| Wet-Ground | 98.48 | 95.82 | 0.78 | 99.45 | 0.40 | 0.45 | 0.59 | 1.90 |
| EXPT. #8 | 16 kG's 0.5 Min R.T. 4 Canisters 20% Solids | | | | | | | |
| Magnet | 98.56 | 95.89 | 0.77 | 99.47 | 0.40 | 0.44 | | |
| Wet-Ground | 98.51 | 95.54 | 0.87 | 99.50 | 0.45 | 0.51 | 0.58 | 1.88 |

As can be seen in Tables III and IV, better test results as reflected by TAPPI brightness response were obtained when the slurry was diluted back to 20% solids for processing through the magnet versus processing conducted at 50% solids. The filler grade PCC subjected to magnetic separation then wet-ground lost only 0.11 to 0.37 points brightness when treated at 50% solids and 0.05 to 0.19 points when treated at 20% solids products (rows labeled magnet minus, rows labeled wet-ground). This is compared to 1.61 points brightness loss for the control pair which was not magnetically separated. The coating grade PCC products of the invention (rows labeled wet-ground) improved 2.0 to 2.7 points brightness as compared to the coating control.

EXAMPLE V

A standard Bedford burnt lime was provided having the following impurities:

$Fe_2O_3$=0.177%
MnO=0.0053%
MgO=1.26%
$SiO_2$=0.738%
S=7050 ppm

The Bedford burnt lime was slaked at a 4:1 weight ratio of water/lime at a slaking temperature of about 65° C. After slaking was complete, the milk of lime (MOL) slurry was either screened at a given mesh size prior to carbonation reaction or screened through a 100 mesh screen and subjected to magnetic separation prior to the carbonation reaction. In the MOL screening experiments, screens of 60, 100, 200, 250 and 325 mesh were respectively employed to remove the coarse particle impurities. For magnetic separation experiments, a 1" High Gradient Magnetic Separator was used and operated at 20 KG using retention times of 1, 2 and 4 minutes. The screened or magnetically separated MOL feeds were then reacted in a PCC reactor under typical carbonation conditions to produce a rhombohedral PCC filler product having a BET surface area of about 7.5 $m^2/g$. Citric acid was added to these MOL feeds (at 3 kg/metric ton) to inhibit the formation of colloidal PCC during reaction. The PCC reaction products were then post reactor screened to −325 mesh and subjected to low solids, non-dispersed wet grinding to yield coating PCC product of about 0.6 micron MPS.

Table V demonstrates the effect of screen size on MOL used to make filler grade PCC and coating grade PCC. FIG. 1 is a graphical representation showing the effect screen size has on the brightness of both filler grade and coating grade PCC. Table VI demonstrates the effect of various magnet retention times on 100 mesh screened MOL used to make filler grade and coating grade PCC. FIG. 2 is a graphical representation showing the effect of magnet residence time on filler grade PCC and coating grade PCC prepared from magnetically separated, −100 mesh MOL.

TABLE V

Physical Properties of PCC Prepared From Screened Bedford Lime

| Sample ID | Sample Desc. | Lime Screens | Brightness | Whiteness | Yellowness | L | a | b | MPS μm | 75/25 slope |
|---|---|---|---|---|---|---|---|---|---|---|
| Filler Control | | 60 mesh (Screen Control) | 97.69 | 93.97 | 1.08 | 99.11 | 0.33 | 0.66 | 1.80 | 1.67 |
| Coating Control | | 60 mesh (Screen Control) | 96.61 | 93.13 | 1.03 | 98.56 | 0.49 | 0.62 | 0.57 | 2.10 |
| 1A | Filler | 100 mesh | 97.61 | 93.95 | 1.07 | 99.06 | 0.40 | 0.64 | 1.76 | 1.64 |
| 1B | Coating | 100 mesh | 96.69 | 93.04 | 1.09 | 98.64 | 0.51 | 0.66 | 0.60 | 2.18 |
| 2A | Filler | 200 mesh | 97.63 | 93.71 | 1.16 | 99.13 | 0.38 | 0.71 | 1.65 | 1.73 |
| 2B | Coating | 200 mesh | 97.45 | 93.87 | 1.05 | 99.00 | 0.40 | 0.63 | 0.60 | 2.29 |
| 3A | Filler | 250 mesh | 97.58 | 94.00 | 1.05 | 99.06 | 0.39 | 0.63 | 1.61 | 1.70 |
| 3B | Coating | 250 mesh | 97.14 | 93.71 | 1.00 | 98.79 | 0.47 | 0.59 | 0.60 | 2.26 |
| 4A | Filler | 325 mesh | 97.62 | 93.81 | 1.13 | 99.12 | 0.40 | 0.69 | 1.67 | 1.66 |
| 4B | Coating | 325 mesh | 97.39 | 93.87 | 1.04 | 98.97 | 0.48 | 0.63 | 0.60 | 2.29 |

TABLE VI

Physical Properties of PCC Prepared From Magnetic Separated Bedford Lime

| Sample ID | Sample Desc. | Lime Processing | Brightness | Whiteness | Yellowness | L | a | b | MPS μm | 75/25 slope |
|---|---|---|---|---|---|---|---|---|---|---|
| Filler Control | | 325 mesh (Magnet Control) | 97.52 | 93.62 | 1.17 | 99.11 | 0.45 | 0.72 | 1.73 | 1.7 |
| Coating Control | | 325 mesh (Magnet Control) | 96.66 | 93.58 | 0.92 | 98.56 | 0.50 | 0.54 | 0.59 | 2.26 |
| 5A | Filler | 325 mesh (20 KG, 4 min RT) | 97.75 | 93.63 | 1.24 | 99.25 | 0.42 | 0.76 | 1.75 | 1.71 |
| 5B | Coating | 325 mesh (20 KG, 4 min RT) | 97.52 | 94.12 | 1.02 | 99.07 | 0.46 | 0.61 | 0.61 | 2.28 |
| 6A | Filler | 325 mesh (20 KG, 2 min RT) | 97.77 | 93.71 | 1.22 | 99.26 | 0.40 | 0.75 | 1.72 | 1.76 |
| 6B | Coating | 325 mesh (20 KG, 2 min RT) | 96.75 | 93.61 | 0.93 | 98.61 | 0.41 | 0.55 | 0.62 | 2.2 |
| 7A | Filler | 325 mesh (20 KG, 1 min RT) | 97.80 | 93.87 | 1.18 | 99.26 | 0.41 | 0.73 | 1.66 | 1.77 |
| 7B | Coating | 325 mesh (20 KG, 1 min RT) | 96.98 | 93.76 | 0.93 | 98.68 | 0.39 | 0.55 | 0.61 | 2.2 |

Although magnetic separation of the MOL feed yielded coating grade PCC brightness improvements, the magnitude of the brightness benefit was noticeably less than that derived when the step of magnetic separation was effected on the wet milled PCC slurry. More specifically, at the highest retention time of 4 minutes at 20 KG, TAPPI brightness was only improved about 0.8 to 0.9 points.

It has been found that the present invention is an economic alternative to securing high quality lime sources. The inventive process adds less than 2% to processing costs of coating grade PCC, while shipping costs for high quality a lime source can typically add 10%.

The present invention may be embodied in other specific forms without departing from the spirit or essential attributes thereof and accordingly reference should be made to the appended claims rather than the foregoing specification as indicating the scope of the invention.

What is claimed is:

1. A precipitated calcium carbonate product comprising a plurality of calcium carbonate particles having a median particle size of less than about 2.0 μm, a TAPPI Brightness of at least about 97, and a 75/25 slope value of less than 2.0.

2. The precipitated calcium carbonate product of claim 1 wherein said calcium carbonate particles have a median particle size of less than about 1.0 μm.

3. The precipitated calcium carbonate product of claim 1 wherein said calcium carbonate particles have a TAPPI Brightness of at least about 98.

4. A method of producing a fine particulate precipitated calcium carbonate having TAAPI brightness of at least 96 comprising the steps of:

providing calcium oxide, said calcium oxide including discoloring impurities;

forming said calcium oxide into an aqueous slurry of calcium carbonate;

deagglomerating said calcium carbonate slurry to liberate said discoloring impurities and reduce the median particle size of said calcium carbonate to less than about 2.0 μm; and magnetically separating said discoloring impurities from said deagglomerated calcium carbonate slurry by subjecting said slurry to a high intensity magnetic field.

5. The method of claim 4 further including the step of fine screening said calcium carbonate slurry through a screen of from about 500 to about 200 mesh.

6. The method of claim 4 further including the step of dispersing said calcium carbonate slurry with a dispersant prior to said step of deagglomeration.

7. The method of claim 6 wherein said dispersant is added in an amount sufficient to reduce the viscosity of said calcium carbonate slurry to less than about 100 cps.

8. The method of claim 4 wherein said step of magnetic separation is effected by subjecting said deagglomerated calcium carbonate slurry to a magnetic field having an average intensity of from about 5 kilogauss to about 20 kilogauss.

9. The method of claim 4 wherein said step of magnetic separation is effected by subjecting said deagglomerated calcium carbonate slurry to a high intensity magnetic field for about 0.5 to about 5 minutes.

10. The method of claim 4 further including the step of de-watering said calcium carbonate slurry after said step of magnetic separation to yield a calcium carbonate product having a median particle size of less than about 2 μm and a TAPPI brightness of at least about 96.

11. The method of claim 4 further including the steps of:
slaking said calcium oxide in order to obtain a slurry of Ca(OH)$_2$ prior to said step of forming said feed source into an aqueous slurry of calcium carbonate;
coarse screening said slurry of Ca(OH)$_2$ through a screen of from about 325 to about 50 mesh, and
carbonating said Ca(OH)$_2$ slurry in a reactor in order to obtain a slurry of precipitated calcium carbonate.

12. The method of claim 11 further including the step of fine screening said Ca(OH)$_2$ slurry through a screen of from about 500 to about 200 mesh prior to said carbonating step.

13. A method of producing a fine particulate precipitated calcium carbonate having TAAPI brightness of at least 96 comprising the steps of:
providing calcium oxide, said calcium oxide including discoloring impurities;
forming said calcium oxide into an aqueous slurry of calcium carbonate;
magnetically separating said discoloring impurities from said aqueous slurry of calcium carbonate by subjecting said slurry to a high intensity magnetic field; and
deagglomerating said calcium carbonate to reduce the median particle size of said calcium carbonate to less than about 2 μm.

14. The method of claim 13 further comprising the step of fine screening said calcium carbonate slurry through a screen of from about 500 to about 200 mesh.

15. The method of claim 13 further including the step of dispersing said aqueous slurry with a dispersant prior to said step of magnetic separation.

16. The method of claim 15 wherein said dispersant is added in an amount sufficient to reduce the viscosity of said aqueous slurry of calcium carbonate to less than about 100 cps.

17. The method of claim 13 wherein said step of magnetic separation is effected by subjecting said aqueous slurry of calcium carbonate to a magnetic field having an average intensity of from about 5 to about 20 kilogauss.

18. The method of claim 13 wherein said step of magnetic separation is effected by subjecting said aqueous slurry of calcium carbonate to a high intensity magnetic field for about 0.5 to about 5 minutes.

19. The method of claim 13 further including the step of de-watering said calcium carbonate slurry after said step of deagglomeration to yield a calcium carbonate product having a median particle size of about less than about 2 μm and a TAPPI brightness of at least about 96.

20. The method of claim 13 further including the steps of:
slaking said calcium oxide in order to obtain a slurry of Ca(OH)$_2$ prior to said step of forming said feed source into an aqueous slurry of calcium carbonate;
coarse screening said slurry of Ca(OH)$_2$ through a screen of from about 325 to about 50 mesh, and
carbonating said Ca(OH)$_2$ in a reactor in order to obtain a slurry of precipitated calcium carbonate.

21. The method of claim 20 further including the step of fine screening said Ca(OH)$_2$ slurry through a screen of from about 500 to about 200 mesh prior to said carbonation step.

22. A method of producing a fine particulate precipitated calcium carbonate having a TAPPI brightness of greater than 96 comprising the steps of:
slaking calcium oxide containing discoloring impurities in order to obtain a slurry of Ca(OH)$_2$;
coarse screening said slurry of Ca(OH)$_2$ through a screen of from about 325 to about 50 mesh;
magnetically separating said discoloring impurities from said Ca(OH)$_2$ slurry by subjecting said slurry to a high intensity magnetic field;
carbonating said Ca(OH)$_2$ slurry in a reactor in order to obtain a slurry of precipitated calcium carbonate; and
deagglomerating said precipitated calcium carbonate slurry to reduce the median particle size to less than about 2 μm.

23. A paper composition including the precipitated calcium carbonate product of claim 1.

* * * * *